Figure 1:
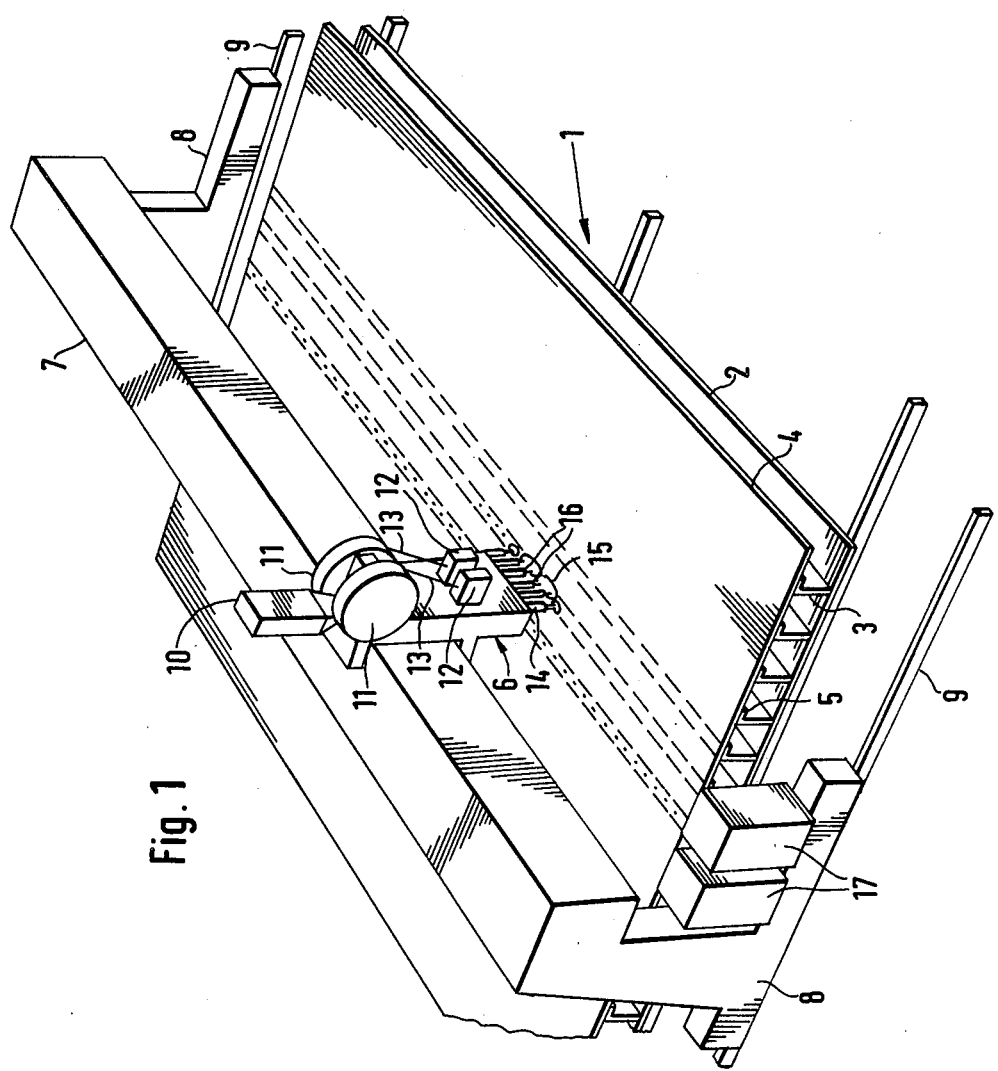
Figure 2:
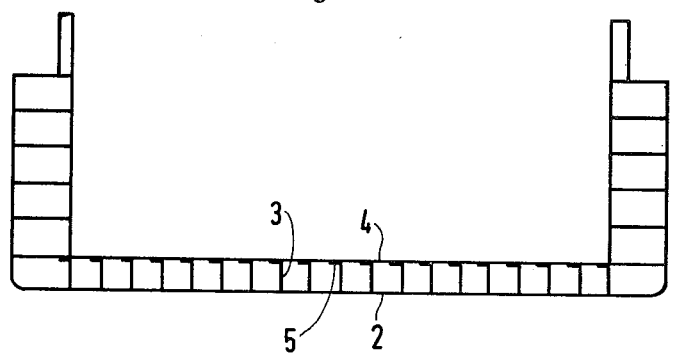
Figure 3:
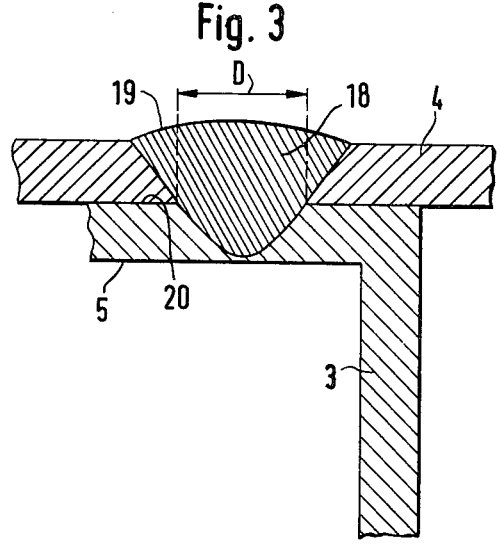
Figure 4:
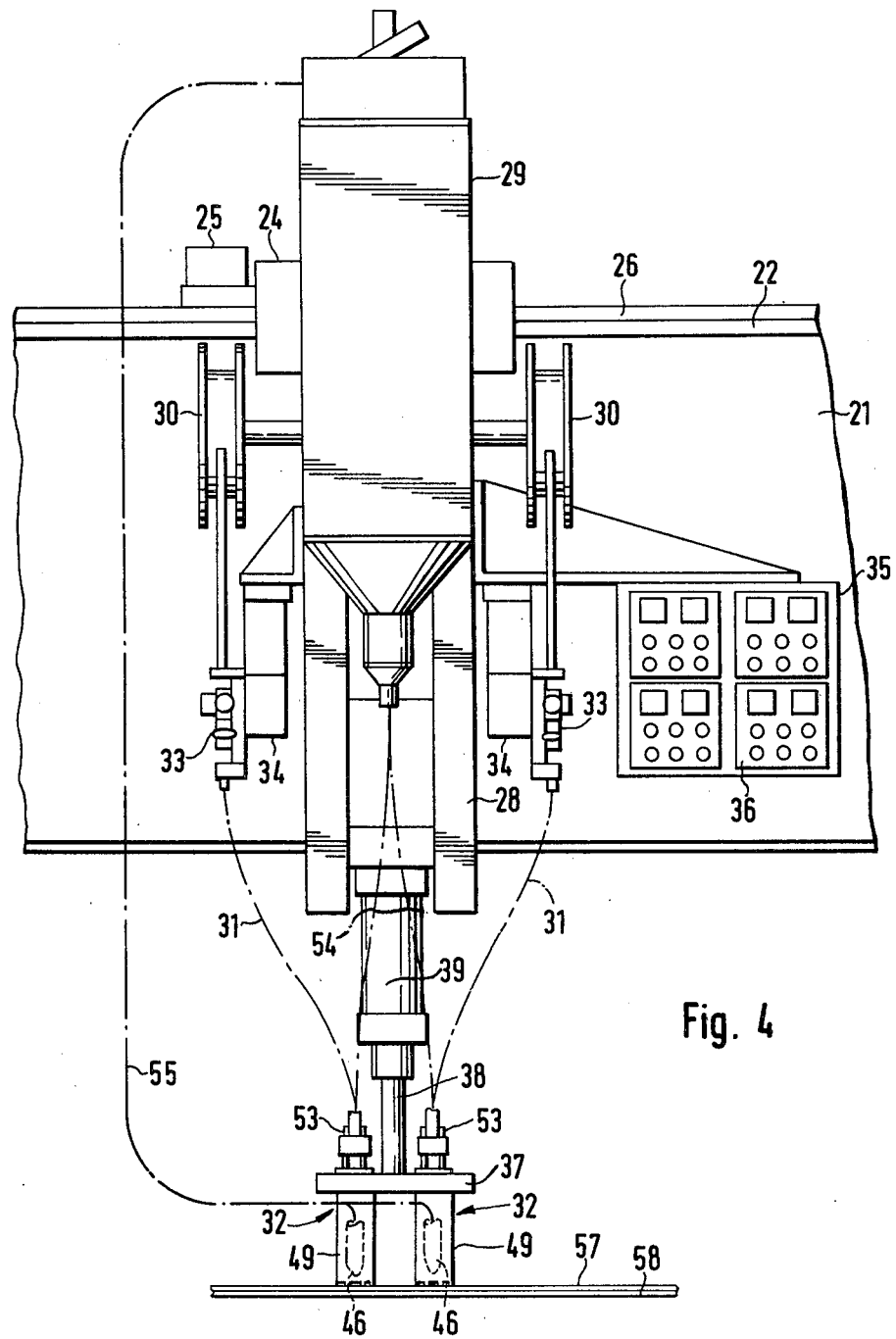
Figure 5:
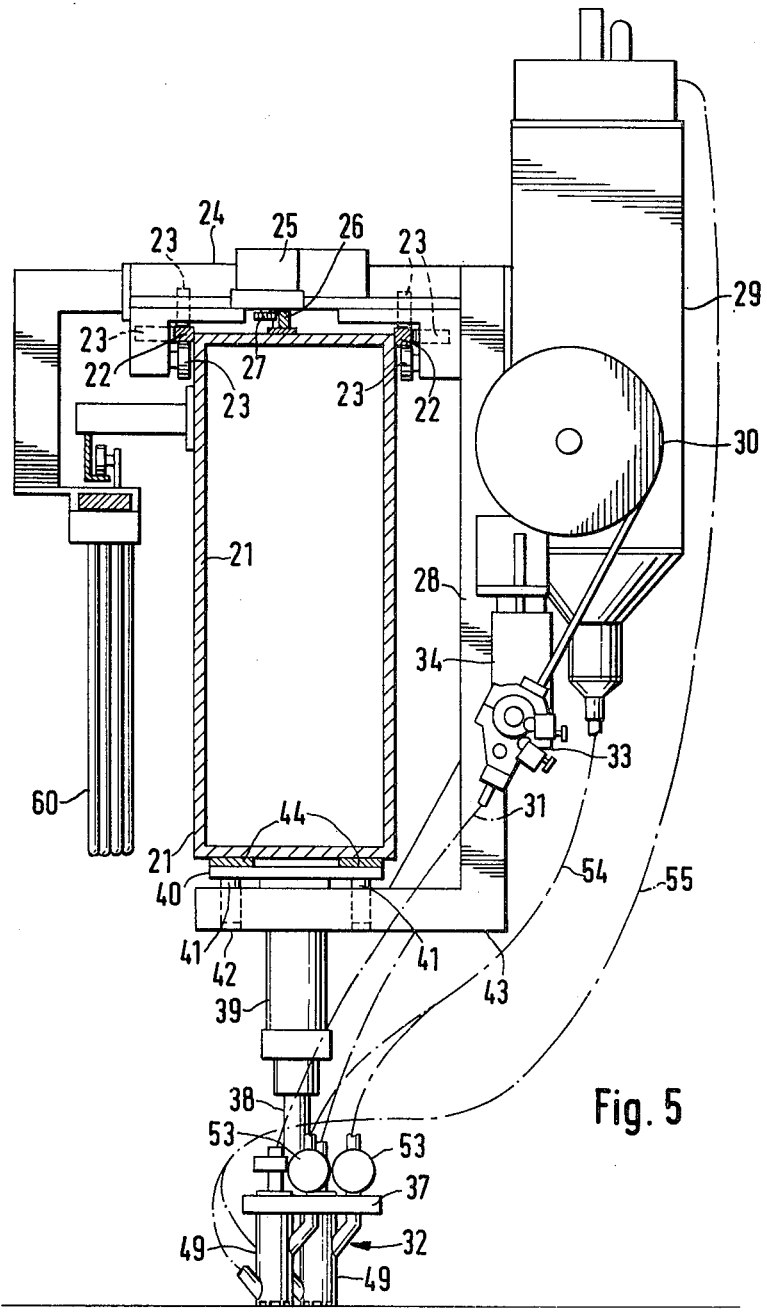

United States Patent [19]

Lundin

[11] 4,327,270
[45] Apr. 27, 1982

[54] SUBMERGED-ARC SPOT WELDING APPARATUS

[75] Inventor: Börje R. Lundin, Laxa, Sweden

[73] Assignee: ESAB Aktiebolag, Sweden

[21] Appl. No.: 178,452

[22] Filed: Aug. 15, 1980

Related U.S. Application Data

[63] Continuation of Ser. No. 890,933, Mar. 28, 1978, abandoned.

[30] Foreign Application Priority Data

Mar. 28, 1977 [SE] Sweden .................. 7703491
May 9, 1977 [SE] Sweden .................. 7705343

[51] Int. Cl.³ .............................. B23K 9/18
[52] U.S. Cl. ................... 219/73.2; 219/73; 219/125.1; 219/127
[58] Field of Search ........... 219/73 R, 73.1, 73.2, 219/124.1, 125.1, 127

[56] References Cited

U.S. PATENT DOCUMENTS

| | | | |
|---|---|---|---|
| 2,293,163 | 8/1942 | Morris | 219/73 |
| 2,367,257 | 1/1945 | Baird | 219/73 X |
| 2,814,719 | 11/1957 | Wilson | 219/127 |
| 3,366,773 | 1/1968 | Edge et al. | 219/127 |
| 3,420,979 | 1/1969 | Gowan | 219/73 X |
| 3,898,415 | 8/1975 | D'Acremont | 219/73 |

FOREIGN PATENT DOCUMENTS

| | | | |
|---|---|---|---|
| 921823 | 12/1954 | Fed. Rep. of Germany | 219/73 |
| 932263 | 9/1955 | Fed. Rep. of Germany | . |
| 1131823 | 2/1961 | Fed. Rep. of Germany | 219/125.1 |
| 1081805 | 6/1954 | France | 219/73 |
| 571618 | 8/1945 | United Kingdom | . |
| 221875 | 9/1968 | U.S.S.R. | 219/73 |
| 456693 | 2/1975 | U.S.S.R. | 219/127 |

Primary Examiner—J. V. Truhe
Assistant Examiner—Keith E. George
Attorney, Agent, or Firm—Lerner, David, Littenberg & Samuel

[57] ABSTRACT

Submerged-arc spot welding apparatus has a carriage for supporting a welding means which is displaceable along a track disposed above a bed or table supporting the work. The carriage is provided with a pressure mechanism consisting of a pressure cylinder guided for motion in the carriage towards and away from the work, a piston in the cylinder having a piston rod attached to a thrust member which is moved into engagement with the work by the outward stroke of the piston. The corresponding backward thrust acting on the cylinder is taken up by stop means rigidly connected to and extending along the track. A stop on the carriage serves to take up the weight of the cylinder when the drive pressure is shut off.

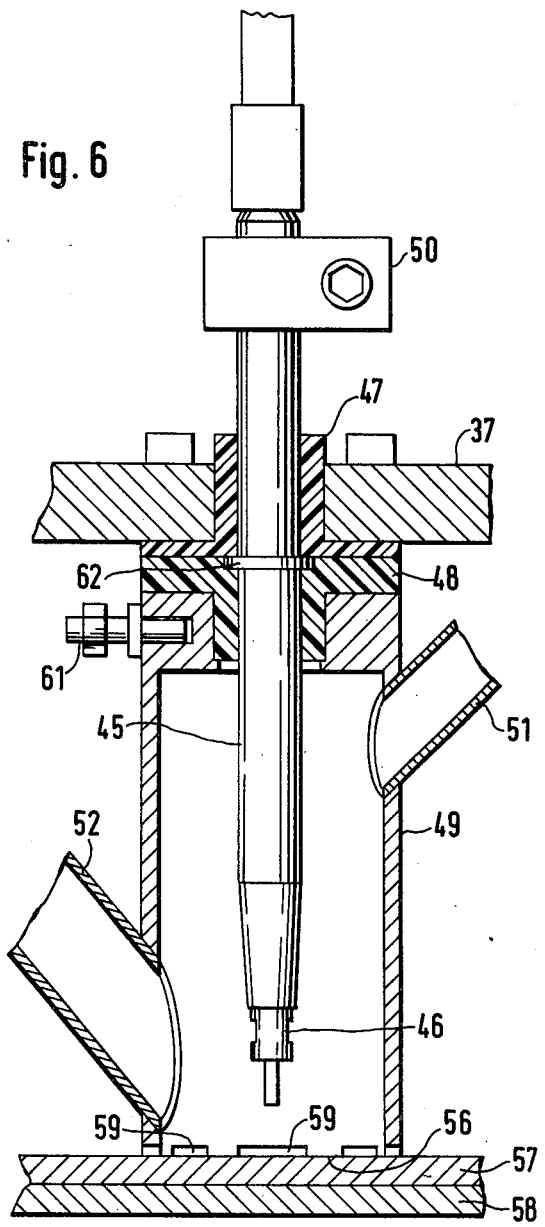

16 Claims, 6 Drawing Figures